United States Patent
Rupley et al.

(10) Patent No.: US 9,430,237 B2
(45) Date of Patent: Aug. 30, 2016

(54) SHARING REGISTER FILE READ PORTS FOR MULTIPLE OPERAND INSTRUCTIONS

(75) Inventors: Jeffrey P. Rupley, Roundrock, TX (US); Dimitri Tan, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 840 days.

(21) Appl. No.: 13/248,843

(22) Filed: Sep. 29, 2011

(65) Prior Publication Data

US 2013/0086357 A1 Apr. 4, 2013

(51) Int. Cl.
G06F 9/30 (2006.01)
G06F 9/38 (2006.01)

(52) U.S. Cl.
CPC ....... *G06F 9/30141* (2013.01); *G06F 9/30098* (2013.01); *G06F 9/3824* (2013.01)

(58) Field of Classification Search
CPC .................................. G06F 9/30098
USPC .......................................... 712/220
See application file for complete search history.

(56) References Cited

U.S. PATENT DOCUMENTS

| | | | | |
|---|---|---|---|---|
| 5,129,067 A | * | 7/1992 | Johnson | 712/213 |
| 5,892,696 A | * | 4/1999 | Kozu | 708/490 |
| 2003/0236967 A1 | * | 12/2003 | Samra et al. | 712/210 |
| 2008/0183456 A1 | * | 7/2008 | Bruski et al. | 703/13 |
| 2011/0061032 A1 | * | 3/2011 | Kojima | 716/104 |
| 2012/0110594 A1 | * | 5/2012 | Talpes et al. | 718/105 |

OTHER PUBLICATIONS

Gabe, Which algorithms benefit most from fused multiply add?, Aug. 28, 2010, StackOverFlow, pp. 1-2.*
Park et al, Reducing Register Ports for Higher Speed and Lower Energy, 2002, Proceedings of the 35th International Symposium on Microarchitecture, pp. 1-12.*
Hennessy and Patterson, Computer Architecture a Quantitative Approach, 1996, Morgan Kaufmann, 2nd edition, pp. 101 and 130.*
Port, Mar. 24, 2010, Webopedia, pp. 1-3.*
Hennessy and Patterson, Computer Architecture a Quantitative Approach, 1996, Morgan Kaufmann, pp. 99-101 and 128-130.*
Gronowski et al, High-Performance Microprocessor Design, May 1998, IEEE Journal of solid-state circuits, vol. 33 No. 5, pp. 676-686.*

* cited by examiner

*Primary Examiner* — Andrew Caldwell
*Assistant Examiner* — Jyoti Mehta

(57) ABSTRACT

A central processing unit includes a register file having a plurality of read ports, a first execution unit having a first plurality of input ports, and logic operable to selectively couple different arrangements of the read ports to the input ports. A method for reading operands from a register file having a plurality of read ports by a first execution unit having a first plurality of input ports includes scheduling an instruction for execution by the first execution unit and selectively coupling a particular arrangement of the read ports to the input ports based on a type of the instruction.

14 Claims, 7 Drawing Sheets

SHARING REGISTER FILE READ PORTS FOR MULTIPLE OPERAND INSTRUCTIONS

CROSS-REFERENCE TO RELATED APPLICATIONS

Not applicable.

BACKGROUND

The disclosed subject matter relates generally to computers, and, more particularly, to the use of staggered read operations for multiple-operand instructions.

Typical x86 instructions require only two operands. Therefore, conventional register file hardware includes two read ports to support reading two source operands per instruction scheduled. Recent Intel AVX ISA extensions contain instructions that require a third source operand. For example, blend instructions (VBLEND*) and fused-multiply-add instructions (VFMADD*, VFMSUB*, VFNMADD*, VFNSUB*) are three operand instructions.

Adding a third dedicated read port to the register file hardware to support a three operand instruction increases the time delay of the register file read and also significantly increases the power consumption and area required by the register file. The register file read-delay, area, and power consumption are parameters typically directly linked to performance, because these parameters influence the maximum number of rename registers that can be supported.

This section of this document is intended to introduce various aspects of art that may be related to various aspects of the disclosed subject matter described and/or claimed below. This section provides background information to facilitate a better understanding of the various aspects of the disclosed subject matter. It should be understood that the statements in this section of this document are to be read in this light, and not as admissions of prior art. The disclosed subject matter is directed to overcoming, or at least reducing the effects of, one or more of the problems set forth above.

BRIEF SUMMARY

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

One aspect of the disclosed subject matter is seen in a central processing unit including a register file having a plurality of read ports, a first execution unit having a first plurality of input ports, and logic operable to selectively couple different arrangements of the read ports to the input ports.

Another aspect of the disclosed subject matter is seen in a computer system including memory operable to store a plurality of instructions and a central processing unit. The central processing unit includes a register file having a plurality of read ports, a first execution unit having a first plurality of input ports, logic operable to selectively couple different arrangements of the read ports to the input ports, and a first scheduler operable to receive at least a subset of the instructions, schedule instructions from the subset in the first execution unit, and control the logic to select particular arrangements for coupling the read ports to the input ports based on a type of the scheduled instruction.

Yet another aspect of the disclosed subject matter is seen in a method for reading operands from a register file having a plurality of read ports by a first execution unit having a first plurality of input ports. The method includes scheduling an instruction for execution by the first execution unit and selectively coupling a particular arrangement of the read ports to the input ports based on a type of the instruction.

BRIEF DESCRIPTION OF THE SEVERAL VIEWS OF THE DRAWINGS

The disclosed subject matter will hereafter be described with reference to the accompanying drawings, wherein like reference numerals denote like elements, and.

Figure 1:
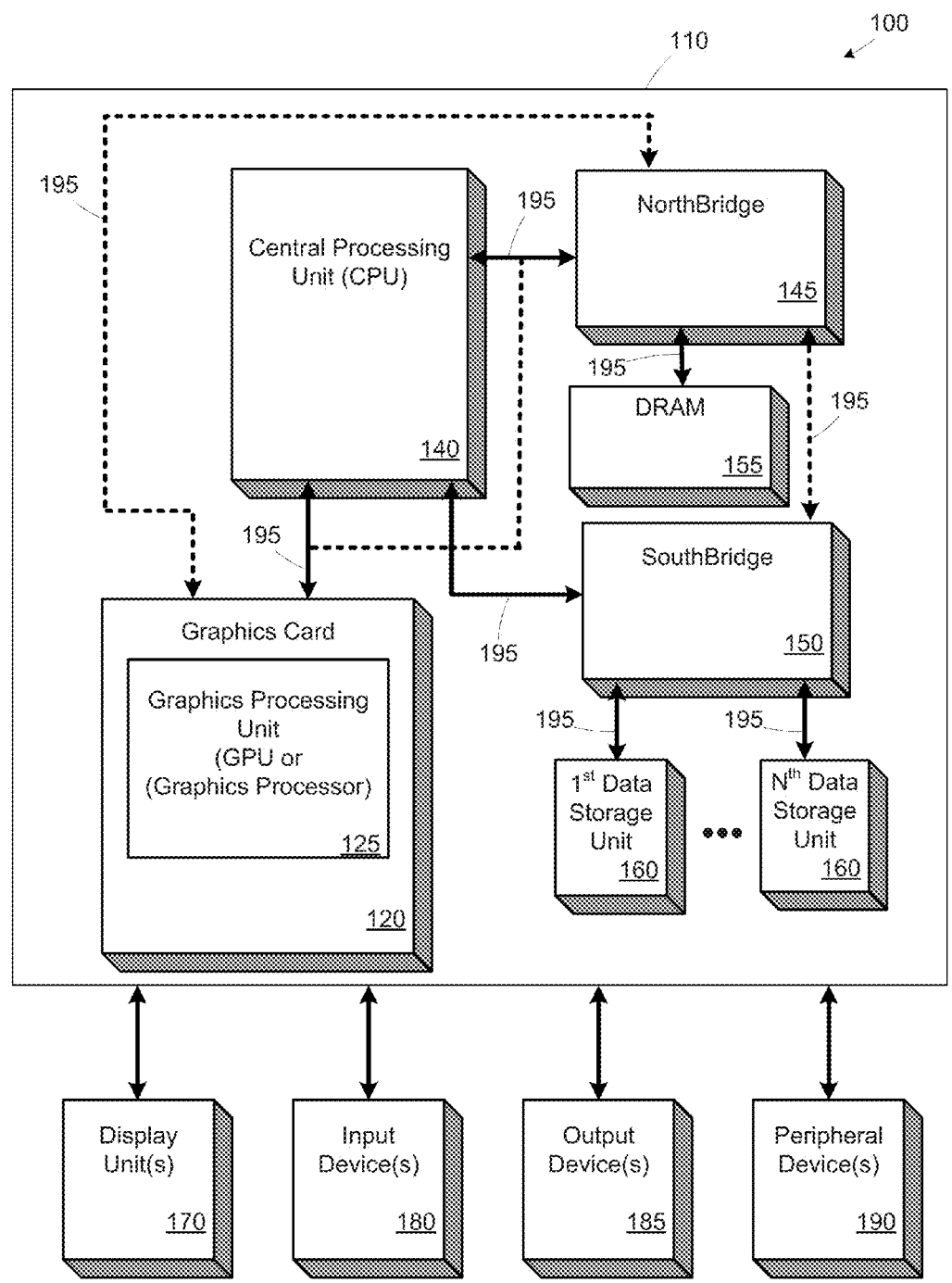
FIG. 1 is a simplified block diagram of a computer system in accordance with an embodiment of the present subject matter.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

DETAILED DESCRIPTION

One or more specific embodiments of the disclosed subject matter will be described below. It is specifically intended that the disclosed subject matter not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the disclosed subject matter unless explicitly indicated as being "critical" or "essential."

The disclosed subject matter will now be described with reference to the attached figures. Various structures, systems and devices are schematically depicted in the drawings for purposes of explanation only and so as to not obscure the disclosed subject matter with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Turning now to FIG. 1, a block diagram of an exemplary computer system 100, in accordance with an embodiment of the present invention, is illustrated. In various embodiments, the computer system 100 may be a personal computer, a laptop computer, a handheld computer, a netbook computer, a mobile device, a telephone, a personal data assistant (PDA), a server, a mainframe, a work terminal, or the like. The computer system includes a main structure 110, which may be a computer motherboard, system-on-a-chip, circuit board or printed circuit board, a desktop computer enclosure and/or tower, a laptop computer base, a server enclosure, part of a mobile device, personal data assistant (PDA), or the like. In one embodiment, the main structure 110 includes a graphics card 120. In one embodiment, the graphics card 120 may be an ATI Radeon™ graphics card from Advanced Micro Devices ("AMD") or any other graphics card using memory, in alternate embodiments. The graphics card 120 may, in different embodiments, be connected on a Peripheral Component Interconnect (PCI) Bus (not shown), PCI-Express Bus (not shown) an Accelerated Graphics Port (AGP) Bus (also not shown), or any other connection known in the art. It should be noted that embodiments of the present invention are not limited by the connectivity of the graphics card 120 to the main computer structure 110. In one embodiment, the computer system 100 runs an operating system such as Linux, Unix, Windows, Mac OS, or the like.

In one embodiment, the graphics card 120 may contain a graphics processing unit (GPU) 125 used in processing graphics data. In various embodiments the graphics card 120 may be referred to as a circuit board or a printed circuit board or a daughter card or the like.

In one embodiment, the computer system 100 includes a central processing unit (CPU) 140, which is connected to a northbridge 145. The CPU 140 and northbridge 145 may be housed on the motherboard (not shown) or some other structure of the computer system 100. It is contemplated that in certain embodiments, the graphics card 120 may be coupled to the CPU 140 via the northbridge 145 or some other connection as is known in the art. For example, the CPU 140, the northbridge 145, and the GPU 125 may be included in a single package or as part of a single die or "chips". Alternative embodiments, which may alter the arrangement of various components illustrated as forming part of main structure 110, are also contemplated. In certain embodiments, the northbridge 145 may be coupled to a system RAM (or DRAM) 155; in other embodiments, the system RAM 155 may be coupled directly to the CPU 140. The system RAM 155 may be of any RAM type known in the art; the type of RAM 155 does not limit the embodiments of the present invention. In one embodiment, the northbridge 145 may be connected to a southbridge 150. In other embodiments, the northbridge 145 and southbridge 150 may be on the same chip in the computer system 100, or the northbridge 145 and southbridge 150 may be on different chips. In various embodiments, the southbridge 150 may be connected to one or more data storage units 160. The data storage units 160 may be hard drives, solid state drives, magnetic tape, or any other writable media used for storing data. In various embodiments, the central processing unit 140, northbridge 145, southbridge 150, graphics processing unit 125, and/or DRAM 155 may be a computer chip or a silicon-based computer chip, or may be part of a computer chip or a silicon-based computer chip. In one or more embodiments, the various components of the computer system 100 may be operatively, electrically and/or physically connected or linked with a bus 195 or more than one bus 195.

In different embodiments, the computer system 100 may be connected to one or more display units 170, input devices 180, output devices 185, and/or peripheral devices 190. It is contemplated that in various embodiments, these elements may be internal or external to the computer system 100, and may be wired or wirelessly connected, without affecting the scope of the embodiments of the present invention. The display units 170 may be internal or external monitors, television screens, handheld device displays, and the like. The input devices 180 may be any one of a keyboard, mouse, track-ball, stylus, mouse pad, mouse button, joystick, scanner or the like. The output devices 185 may be any one of a monitor, printer, plotter, copier or other output device. The peripheral devices 190 may be any other device which can be coupled to a computer: a CD/DVD drive capable of reading and/or writing to physical digital media, a USB device, Zip Drive, external floppy drive, external hard drive, phone and/or broadband modem, router/gateway, access point and/or the like. To the extent certain exemplary aspects of the computer system 100 are not described herein, such exemplary aspects may or may not be included in various embodiments without limiting the spirit and scope of the embodiments of the present invention as would be understood by one of skill in the art.

Figure 2:
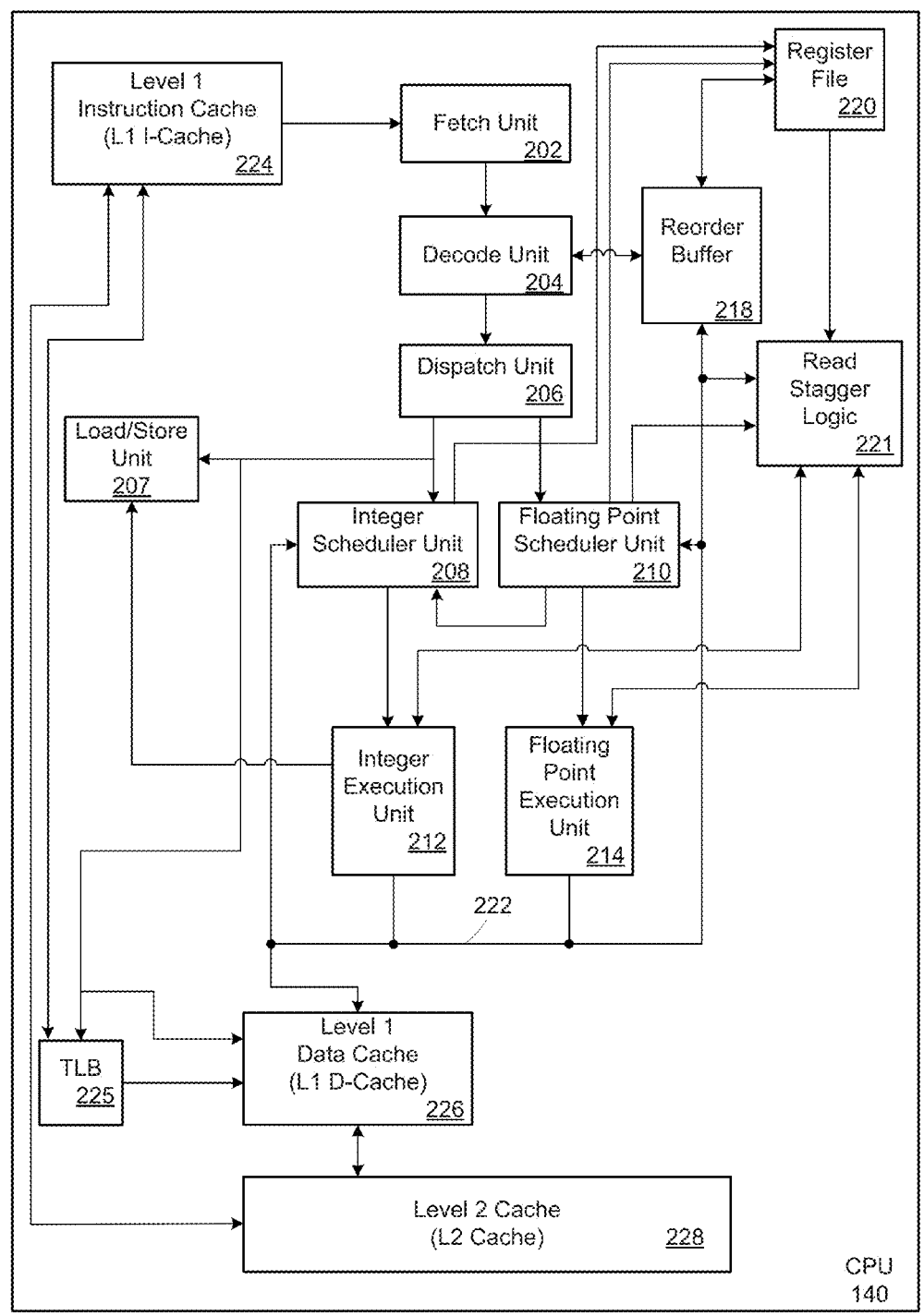
FIG. 2 is a simplified block diagram of a central processing unit in the system of FIG. 1.

Turning now to FIG. 2, a diagram of an exemplary implementation of the CPU 140, in accordance with an embodiment of the present invention, is illustrated. The CPU 140 includes a fetch unit 202, a decode unit 204, a dispatch unit 206, a load/store unit 207, an integer scheduler unit 208 a floating-point scheduler unit 210, an integer execution unit 212, a floating-point execution unit 214, a reorder buffer 218, a register file 220, and read stagger logic 221.

In one or more embodiments, the various components of the CPU 140 may be operatively, electrically and/or physically connected or linked with a bus or more than one bus. The CPU 140 may also include a results bus 222, which couples the integer execution unit 212 and the floating-point execution unit 214 with the reorder buffer 218, the integer scheduler unit 208, and the floating-point scheduler unit 210. Results that are delivered to the results bus 222 by the execution units 212, 214 may be used as operand values for subsequently issued instructions and/or values stored in the reorder buffer 218. The CPU 140 includes a data bus 223 to allow the execution units 210, 212 to read data from the register file 220. The schedulers 208, 210 may communicate directly with the register file 220 to facilitate the exchange of data between the register file 220 and the execution units 212, 214, or in an alternative embodiment, coordination may be accomplished through the communication between the schedulers 208, 210 and the decode and dispatch units 204, 206. The read stagger logic 221 is provided between the execution units 210, 212 on the data bus 223 and is controlled by the floating point scheduler unit 210 to allow staggering of reads for three operand instructions.

The CPU 140 may also include a Level 1 Instruction Cache (L1 I-Cache) 224 for storing instructions, a Level 1 Data Cache (L1 D-Cache 226) for storing data and a Level 2 Cache (L2 Cache) 228 for storing data and instructions. As shown, in one embodiment, the L1 D-Cache 226 may be coupled to the integer execution unit 212 via the results bus 222, thereby enabling the integer execution unit 212 to request data from the L1 D-Cache 226. In some cases, the integer execution unit 212 may request data not contained in the L1 D-Cache 226. Where requested data is not located in the L1 D-Cache 226, the requested data may be retrieved from a higher-level cache (such as the L2 cache 228) or memory 155 (shown in FIG. 1). In another embodiment, the L1 D-cache 226 may also be coupled to the floating-point execution unit 214. In this case, the integer execution unit 212 and the floating-point execution unit 214 may share a unified L1 D-Cache 226. In another embodiment, the floating-point execution unit 214 may be coupled to its own respective L1 D-Cache (not shown). As shown, in one embodiment, the integer execution unit 212 and the floating-point execution unit 214 may be coupled to and share an L2 cache 228. In another embodiment, the integer execution unit 212 and the floating-point execution unit 224 may be each coupled to its own respective L2 cache (not shown). In one embodiment, the L2 cache 228 may provide data to the L1 I-Cache 224 and L1 D-Cache 226. In another embodiment, the L2 cache 228 may also provide instruction data to the L1 I-Cache 224. In different embodiments, the L1 I-Cache 224, L1 D-Cache 226, and the L2 Cache 228 may be may be implemented in a fully-associated, set-associative, or direct mapped configuration. In one embodiment, the L2 Cache 228 may be larger than the L1 I-Cache 224 or the L1 D-Cache 226. In alternate embodiments, the L1 I-Cache 224, the L1 D-Cache 226 and/or the L2 cache 228 may be separate from or external to the CPU 140 (e.g., located on the motherboard). It should be noted that embodiments of the present invention are not limited by the sizes and configuration of the L1 I-Cache 224, the L1 D-Cache 226, and the L2 cache 228.

The CPU 140 may support out-of-order instruction execution. Accordingly, the reorder buffer 218 may be used to maintain the original program sequence for register read and write operations, to implement register renaming, and to allow for speculative instruction execution and branch misprediction recovery. The reorder buffer 218 may be implemented in a first-in-first-out (FIFO) configuration in which operations move to the bottom of the reorder buffer 218 as they are validated, making room for new entries at the top of the reorder buffer 218. The reorder buffer 218 may retire an instruction once an operation completes execution and any data or control speculation performed on any operations, up to and including that operation in program order, is verified.

The fetch unit 202 may be coupled to the L1 I-cache 224 (or a higher memory subsystem, such as the L2 cache 228 or external memory 155 (shown in FIG. 1)). The fetch unit 202 may fetch instructions from the L1 I-Cache for the CPU 140 to process. The fetch unit 202 may contain a program counter, which holds the address in the L1 I-Cache 224 (or higher memory subsystem) of the next instruction to be executed by the CPU 140. In one embodiment, the instructions fetched from the L1 I-cache 224 may be complex instruction set computing (CISC) instructions selected from a complex instruction set, such as the x86 instruction set implemented by processors conforming to the x86 processor architecture. Once the instruction has been fetched, the instruction may be forwarded to the decode unit 204.

The decode unit 204 may decode the instruction and determine the opcode of the instruction, the source and destination operands for the instruction, and a displacement value (if the instruction is a load or store) specified by the encoding of the instruction. The source and destination operands may be values in registers or in memory locations. A source operand may also be a constant value specified by immediate data specified in the instruction encoding. Values for source operands located in registers may be requested by the decode unit 204 from the reorder buffer 218. The reorder buffer 218 may respond to the request by providing an operand tag corresponding to the register operand for each source operand. The reorder buffer 218 may also provide the decode unit 204 with a result tag associated with the destination operand of the instruction if the destination operand is a value to be stored in a register. As instructions are completed by the execution units 212, 214, each of the execution units 212, 214 may broadcast the result of the instruction and the result tag associated with the result on the results bus 222.

After the decode unit 204 decodes the instruction, the decode unit 204 may forward the instruction to the dispatch unit 206. The dispatch unit 206 may determine if an instruction is forwarded to either the integer scheduler unit 208 or the floating-point scheduler unit 210. For example, if an opcode for an instruction indicates that the instruction is an integer-based operation, the dispatch unit 206 may forward the instruction to the integer scheduler unit 208. Conversely, if the opcode indicates that the instruction is a floating-point operation, the dispatch unit 206 may forward the instruction to the floating-point scheduler unit 210.

In one embodiment, the dispatch unit 206 may also forward load instructions ("loads") and store instructions ("stores") to the load/store unit 207. The load/store unit 207 may store the loads and stores in various queues and buffers to facilitate in maintaining the order of memory operations by keeping in-flight memory operations (i.e., operations which have completed but have not yet retired) in program order. The load/store unit 207 may also maintain a queue (e.g., a retired store queue) that maintains a listing of all stores that have been retired by the ROB 218, but have not yet been written to memory, such as the L1 D-Cache 226.

Once an instruction is ready for execution, the instruction is forwarded from the appropriate scheduler unit 208, 210 to the appropriate execution unit 212, 214. Instructions from the integer scheduler unit 208 are forwarded to the integer execution unit 212. In one embodiment, the L1 D-Cache 226, the L2 cache 228 or the memory 155 may be accessed using a physical address. Therefore, the CPU 140 may also include a translation lookaside buffer (TLB) 225 to translate virtual addresses into physical addresses.

Instructions from the floating point scheduler unit 210 are forwarded to the floating point execution unit 214. As will be described in greater detail below, for three operand instructions, the floating point scheduler unit 210 controls the read stagger logic 221 to allow the floating point execution unit 214 to read the required operands from the register file 220 using a staggered arrangement.

Figure 3A:
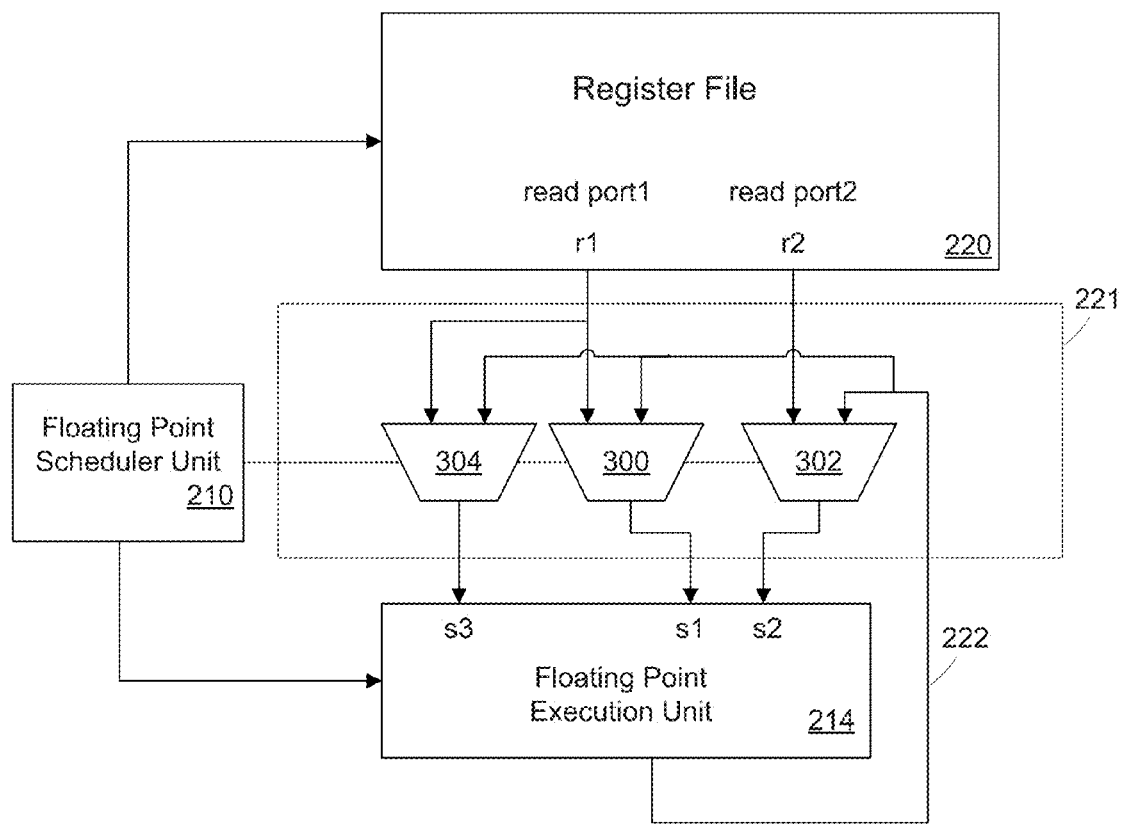
FIG. 3 is a simplified block diagram illustrating one embodiment of logic for interfacing between a register file and an execution unit in the central processing unit of FIG. 2.

In one embodiment of the present subject matter illustrated in FIG. 3a, the floating point scheduler unit 210 controls the interface between the floating point execution unit 214 and the register file 220 using the read stagger logic 221 to process a three operand instruction using multiple cycles. As shown in FIG. 3a, the register file 220 includes two read ports r1, r2. The floating point execution unit 214 includes three input ports s1, s2, s3. The read stagger logic 221 includes multiplexers 300, 302, 304 for coupling the read ports of the register file 220 to the floating point execution unit 214 in different combinations. The multiplexer 300 may select the first read port r1 or the results bus 222 for routing to the first input port s1. The multiplexer 302 may select the second read port r2 or the results bus 222 for routing to the second input port s2. The multiplexer 304 may select the first read port r1 or the results bus 222 for routing to the third input port s3. The particular multiplexing arrangement illustrated is exemplary, and it is contemplated that other arrangements may be used to share the read ports r1, r2, across the input ports s1, s2, s3.

Figures 3B, 4:
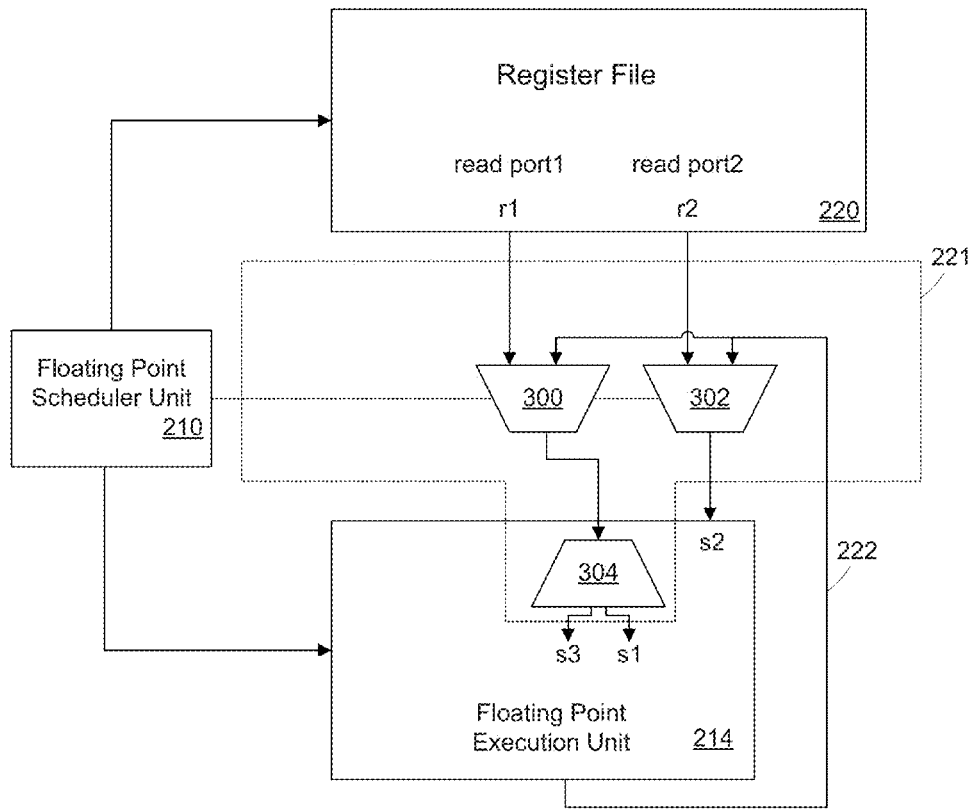
FIG. 4 is an execution pipeline diagram illustrating the processing of a three operand instruction using the arrangement of FIG. 3.

Although the input port s3 is shown as being an independent port, it is contemplated that it may be implemented by sharing the external interface with one of the other input ports s1, s2 and internally routing the input to different logic within the floating point execution unit 214 when the s3 port is used, as illustrated in FIG. 3b. In such an embodiment, a portion of the read stagger logic 221 is internal to the floating point execution unit 214 (e.g., the multiplexer 304). When executing a three operand instruction, the floating point execution unit 214 reroutes the shared input port to the s3 logic for the second read cycle. The floating point scheduler unit 210 may direct the floating point execution unit 214 to reroute the input port, or the floating point execution unit 214 may reroute the input port responsive to identifying the three-operand instruction.

A diagram of an execution pipeline 400 for exemplary three operand instructions executed using the arrangement of FIG. 3a or 3b is illustrated in FIG. 4. In the illustrated example, three successive three operand instructions (instr1, instr2, instr3) are executed. In a first cycle 402, the multiplexers 300, 302, 304 are aligned by the floating point scheduler unit 210 to select the read ports, r1, r2, respectively, and operands are read into ports s1, s2 of the floating point execution unit 214. In cycle 404, the multiplexer 304 is aligned with the first read port r1 to read the third operand into the third input port s3. A first stage of instr1 is executed in cycle 404 using the first two operands. In cycle 406, the second stage of instr1 is executed using the third operand read in port s3.

Because instr1 takes two pipeline cycles to complete, a bubble 408 (i.e., delay) is inserted prior to allowing instr2 to begin. Instr2 completes in cycles 410, 412, 414 in a similar manner to instr1, and bubbles 416, 417 are inserted prior to allowing instr3 to complete in cycles 418, 420, 422.

Note that although bubbles 408, 416, 417 are inserted between instructions, delaying the execution of subsequent instructions, the three operand instruction can begin executing on the first two operands while the third source data is being read.

In some embodiments, the floating point execution unit 214 may use an iterative method for double-precision floating point multiplication in which the multiplier stage is iterated for two cycles. If such a multiplier arrangement is used for implementation of fused-multiply-add instructions, then the first cycle of the multiply iteration can occur while the third operand is being read (i.e., cycle 404). In the second cycle of execution (i.e., cycle 406), the second cycle of the multiply iteration can occur in parallel with the alignment of the addend. Therefore, a double-precision fused-multiply addition instruction would have the same latency as a double-precision multiply instruction, resulting in a performance improvement.

Figure 5:
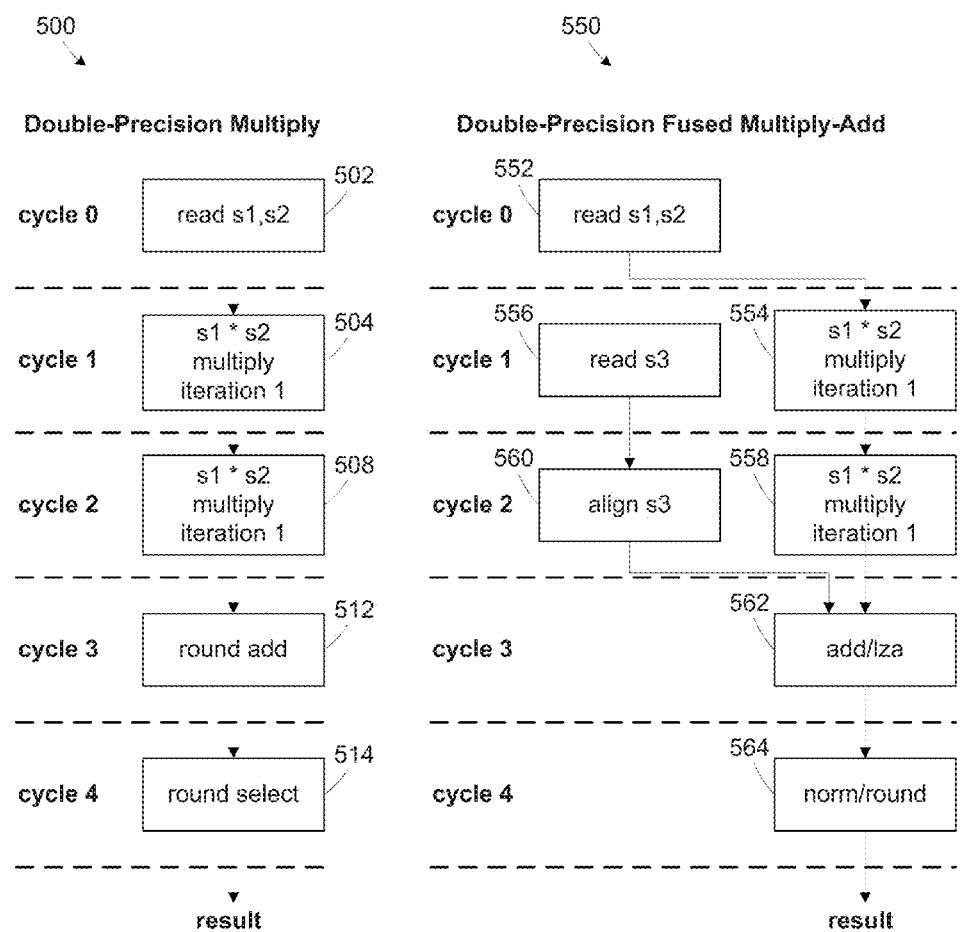
FIG. 5 illustrates execution pipeline diagrams comparing a double-precision multiply to a double precision fused multiply-add as processed using the arrangement of FIG. 3.

FIG. 5 is a diagram comparing an execution pipeline 500 for a double-precision floating-point implementation and an execution pipeline 550 for a double-precision floating-point fused multiply addition implementation. The execution pipeline 500 includes a read cycle 502 where the first two operands are read. Similarly, the execution pipeline 550 also includes a read cycle 552 where the first two operands are read. In corresponding cycles 504, 554 the first multiply iteration is completed in both pipelines 500, 550. In the pipeline 550, a cycle 556 is provided to read the third operand while the cycle 554 is executing. In corresponding cycles 508, 558, the second multiply iteration completes. In the pipeline 550, a cycle 560 is provided to align the third operand while the cycle 558 is executing. In cycle 512 a round add is completed, while in corresponding cycle 562 an add with leading zero anticipation (Iza) is completed. In cycle 514 a round select is completed, while in corresponding cycle 564 a normalization and rounding step is completed. Hence, the results of the double-precision floating-point the double-precision floating-point fused multiply addition can be generated in the same number of cycles.

Figure 6:
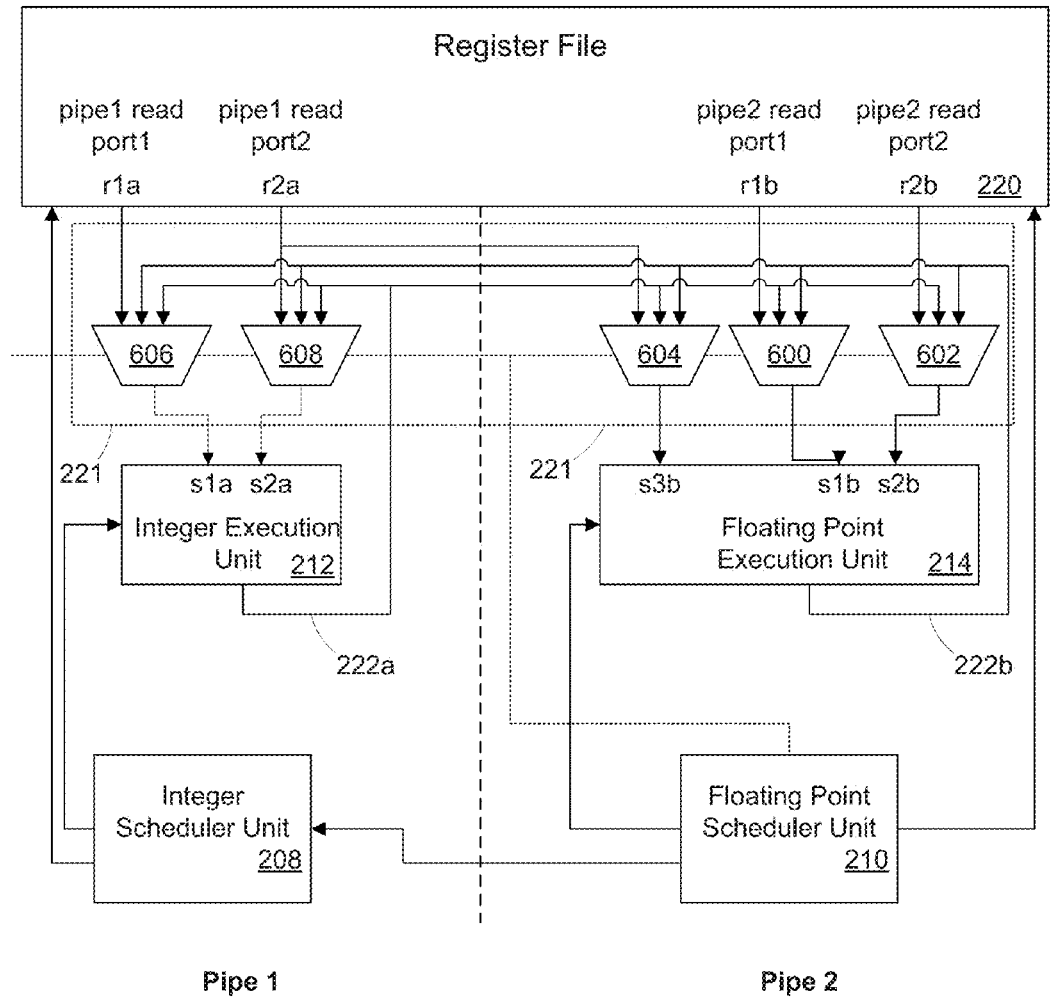
FIG. 6 is a simplified block diagram illustrating another embodiment of logic for interfacing between a register file and an execution unit in the central processing unit of FIG. 2.

In another embodiment of the present subject matter illustrated in FIG. 6, the floating point scheduler unit 210 controls the interfaces between both the floating point execution unit 214 and the integer execution unit 212 with the register file 220 using the read stagger logic 221 to process a three operand instruction by sharing the read ports of the integer execution unit 212. As shown in FIG. 6, the register file 220 includes two read ports r1a, r2a for the integer execution unit 212 and two read ports r1b, r2b for the floating point execution unit 214. The integer execution unit 212 includes two input ports s1a, s2a, and the floating point execution unit 214 includes three input ports s1b, s2b, s3b. The read stagger logic 221 includes multiplexers 600, 602, 604, 606, 608 for coupling the read ports of the register file 220 to the execution units 212, 214 in different combinations. The multiplexer 600 may select the first read port r1b, the results bus 222a of the integer execution unit 212, or the results bus 222b of the floating point execution unit 214 for routing to the first input port s1b. The multiplexer 602 may select the second read port r2b, the results bus 222a, or the results bus 222b for routing to the second input port s2b. The multiplexer 604 may select the second read port r2a of the integer execution unit 212, the results bus 222a, or the results bus 222b for routing to the third input port s3. The multiplexer 606 may select the first read port r1a, the results bus 222a, or the results bus 222b for routing to the first input port s1a. The multiplexer 608 may select the second read port r2a, the results bus 222a, or the results bus 222b for routing to the second input port s2a. Again, the particular multiplexing arrangement illustrated is exemplary, and it is contemplated that other arrangements may be used to share the read ports r1a, r1b, r2a, r2b across the input ports s1a, s1b, s2a, s2b, and s3b.

Figure 7:
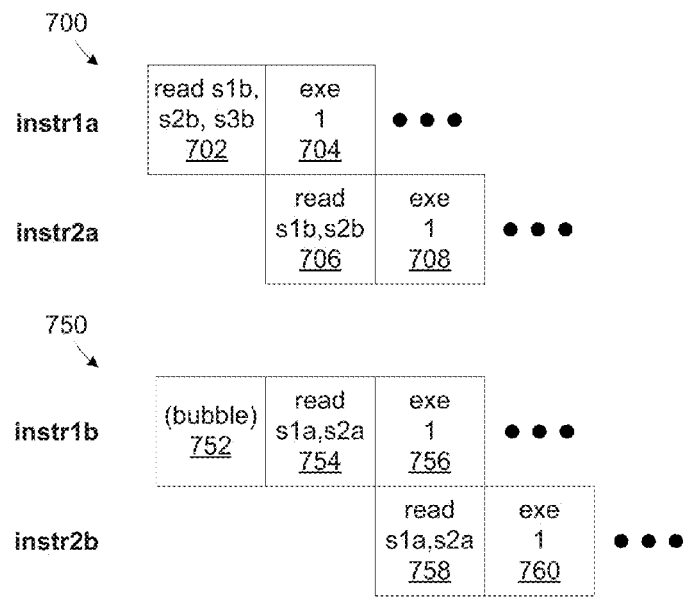
FIG. 7 is an execution pipeline diagram illustrating the processing of a three operand instruction using the arrangement of FIG. 6.

A diagram of a floating point execution pipeline 700 and an integer execution pipeline 750 for exemplary three operand instructions executed using the arrangement of FIG. 6 is illustrated in FIG. 7. In the illustrated example, the floating point scheduler unit 210 receives a three operand instruction (instr1 a) and the integer scheduler unit 208 concurrently receives a two operand instruction (instr1 b). In a first cycle 702, the multiplexers 600, 602, 604 are aligned by the floating point scheduler unit 210 to select the read ports, r1 b, r2b, and r2a, respectively, and operands are read into ports s1 b, s2b, s3b of the floating point execution unit 214. The floating point scheduler unit 210 informs the integer scheduler unit 208 that a three operand instruction is being scheduled, and the integer scheduler unit 208 inserts a bubble 752 in the pipeline 750 for the integer execution unit 212 to delay instr1 b and avoid a read collision at the register file 220. After cycle 702, the multiplexers 600, 602 are aligned to ports r1 b, r2b, respectively, and the multiplexers 606, 608 are aligned to read ports r1 a, r2a, respectively. In cycle 704, instr1 a executes, and in cycle 706, the read for instr2a(e.g., a two operand instruction) completes. In cycle 708 instr2a executes. In the other pipeline 750, the integer execution unit 212 reads into ports s1 a, s2a for instr1 b in cycle 754 and executes instr1 b in cycle 756. While executing instr1 b, the integer execution unit 212 reads into ports s1 a, s2a for instr2b in cycle 758. Instr2b executes in cycle 760. As illustrated in FIG. 7, the three operand instruction in the floating point execution pipeline 700 delays the execution of the two operand instruction in the integer pipeline 750 by one cycle.

Although the preceding examples describe three operand instructions for the floating point execution unit 214, it is also contemplated that the integer execution unit 212 may implement three operand instructions. For example, a 3-operand integer multiply-accumulate or a 3-operand vector permute (VPPERM) are exemplary instructions that may be implemented by the integer execution unit 212. Hence, the read stagger logic 221 and the integer scheduler unit 208 may be modified in a similar manner to that described for their floating point counterparts to support three operand instructions so that either or both of the execution units 212, 214 may be configured to implement three operand instructions. In an embodiment where one or both execution units 212, 214 borrow a read port from the other execution unit, the schedulers 208, 210 coordinate the instruction execution to avoid collisions.

Figure 8:
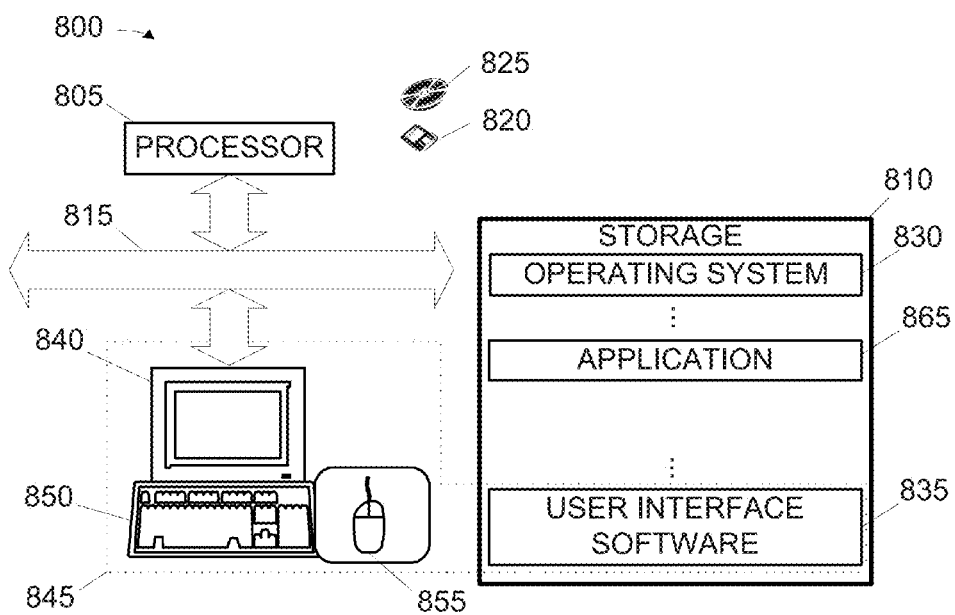
FIG. 8 is a simplified diagram of a computing apparatus that may be programmed to direct the fabrication of the central processing unit of FIG. 2.

FIG. 8 illustrates a simplified diagram of selected portions of the hardware and software architecture of a computing apparatus 800 such as may be employed in some aspects of the present subject matter. The computing apparatus 800 includes a processor 805 communicating with storage 810 over a bus system 815. The storage 810 may include a hard disk and/or random access memory ("RAM") and/or removable storage, such as a magnetic disk 820 or an optical disk 825. The storage 810 is also encoded with an operating system 830, user interface software 835, and an application 865. The user interface software 835, in conjunction with a display 840, implements a user interface 845. The user interface 845 may include peripheral I/O devices such as a keypad or keyboard 850, mouse 855, etc. The processor 805 runs under the control of the operating system 830, which may be practically any operating system known in the art. The application 865 is invoked by the operating system 830 upon power up, reset, user interaction, etc., depending on the implementation of the operating system 830. The application 865, when invoked, performs a method of the present subject matter. The user may invoke the application 865 in conventional fashion through the user interface 845. Note that although a stand-alone system is illustrated, there is no need for the data to reside on the same computing apparatus 800 as the application 865 by which it is processed. Some embodiments of the present subject matter may therefore be implemented on a distributed computing system with distributed storage and/or processing capabilities.

It is contemplated that, in some embodiments, different kinds of hardware descriptive languages (HDL) may be used in the process of designing and manufacturing very large scale integration circuits (VLSI circuits), such as semiconductor products and devices and/or other types semiconductor devices. Some examples of HDL are VHDL and Verilog/Verilog-XL, but other HDL formats not listed may be used. In one embodiment, the HDL code (e.g., register transfer level (RTL) code/data) may be used to generate GDS data, GDSII data and the like. GDSII data, for example, is a descriptive file format and may be used in different embodiments to represent a three-dimensional model of a semiconductor product or device. Such models may be used by semiconductor manufacturing facilities to create semiconductor products and/or devices. The GDSII data may be stored as a database or other program storage structure. This data may also be stored on a computer readable storage device (e.g., storage 810, disks 820, 825, solid state storage, and the like). In one embodiment, the GDSII data (or other similar data) may be adapted to configure a manufacturing facility (e.g., through the use of mask works) to create devices capable of embodying various aspects of the instant invention. In other words, in various embodiments, this GDSII data (or other similar data) may be programmed into the computing apparatus 800, and executed by the processor 805 using the application 865, which may then control, in whole or part, the operation of a semiconductor manufacturing facility (or fab) to create semiconductor products and devices. For example, in one embodiment, silicon wafers containing the central processing unit 140 of FIG. 2 may be created using the GDSII data (or other similar data).

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosed subject matter. Accordingly, the protection sought herein is as set forth in the claims below.

We claim:

1. A central processing unit, comprising:
a register file having a plurality of read ports;
a first execution unit having a first plurality of input ports;
a second execution unit having a second plurality of input ports, wherein a first subset of the plurality of read ports is associated with the first plurality of input ports of the first execution unit and a second subset of the plurality of read ports is associated with the second plurality of input ports of the second execution unit;
a first scheduler circuit to schedule instructions for the first execution unit;
a second scheduler circuit to schedule instructions for the second execution unit; and multiplexers to selectively couple different arrangements of the plurality of read ports to the first plurality of input ports, wherein the multiplexers are to route at least one of the plurality of read ports in the second subset to one of the first plurality of input ports and the first scheduler circuit is to instruct the second scheduler circuit to delay the instructions scheduled for the second execution unit by inserting a bubble between the instructions scheduled for the second execution unit while the multiplexers are configured to route at least one of the plurality of read ports in the second subset to one of the first plurality of input ports.

2. The central processing unit of claim 1, wherein the first subset of the plurality of read ports is lesser in number than the first plurality of input ports.

3. The central processing unit of claim 1, wherein the first scheduler circuit is to receive instructions for the first execution unit, schedule the received instructions in the first execution unit, and control the multiplexers.

4. The central processing unit of claim 1, wherein the first execution unit further comprises a results bus and the multiplexers are to selectively couple different arrangements of the plurality of read ports and the results bus to the first plurality of input ports.

5. The central processing unit of claim 1, wherein the first scheduler circuit is to receive and schedule a multiple operand instruction in the first execution unit, and the first execution unit is to read a first subset of operands for the multiple operand instruction from the first subset of the plurality of read ports, read a second subset of operands for the multiple operand instruction from the second subset of the plurality of read ports while the multiplexers are configured to route at least one of the plurality of read ports in the second subset to one of the first plurality of input ports.

6. The central processing unit of claim 5, wherein the second scheduler circuit is to schedule the bubble in the second execution unit while the first execution unit reads the second subset of operands.

7. The central processing unit of claim 6, wherein the multiplexers are to route the second plurality of input ports to the second subset of the plurality of read ports after the bubble.

8. A computer system, comprising:
memory to store a plurality of instructions; and
a central processing unit, comprising:
a register file having a plurality of read ports;
a first execution unit having a first plurality of input ports;
multiplexers to selectively couple different arrangements of the plurality of read ports to the first plurality of input ports;
a first scheduler circuit to receive at least a subset of the plurality of instructions, schedule a first instruct on from the subset in the first execution unit, and control the multiplexers to select arrangements for coupling the plurality of read ports to the first plurality of input ports based on a type of the first instruction;
a second execution unit having a second plurality of input ports, wherein a first subset of the plurality of read ports is associated with the first plurality of input ports of the first execution unit and a second subset of the plurality of read ports is associated with the second plurality of input ports of the second execution unit; and
a second scheduler circuit to schedule instructions for the second execution unit, wherein the first scheduler circuit is to control the multiplexers to route at least one of the plurality of read ports in the second subset to one of the first plurality of input ports and is to instruct the second scheduler circuit to delay instructions scheduled for the second execution unit by inserting a bubble between the instructions scheduled for the second execution unit while the multiplexers are configured to route at least one of the plurality of read ports in the second subset to one of the first plurality of input ports.

9. The system of claim 8, wherein the first execution unit further comprises a results bus and the multiplexers are to selectively couple different arrangements of the plurality of read ports and the results bus to the first plurality of input ports.

10. The system of claim 8, wherein the first scheduler circuit is to receive and schedule a multiple operand instruction in the first execution unit, and the first execution unit is to read a first subset of operands for the multiple operand instruction from the first subset of the plurality of read ports, read a second subset of operands for the multiple operand instruction from the second subset of the plurality of read ports while the multiplexers are configured to route at least one of the plurality of read ports in the second subset to one of the first plurality of input ports.

11. The system of claim 10, wherein the second scheduler circuit is to schedule the bubble in the second execution unit while the first execution unit reads the second subset of operands.

12. A method for reading operands from a register file having a plurality of read ports by a first execution unit having a first plurality of input ports, comprising:
scheduling an instruction to be executed by the first execution unit using a first scheduler circuit associated with the first execution unit, wherein a first subset of the plurality of read ports is associated with the first plurality of input ports of the first execution unit, and a second subset of the plurality of read ports is associated with a second plurality of input ports of a second execution unit having a second scheduler circuit;
selectively coupling a particular arrangement of the plurality of read ports to the first plurality of input ports based on a type of the instruction by routing at least one of the plurality of read ports in the second subset to one of the first plurality of input ports; and
sending a signal from the first scheduler circuit to the second scheduler circuit to instruct the second scheduler circuit to delay instructions scheduled for the second execution unit by inserting a bubble between the instructions scheduled for the second execution unit while the at least one of the plurality of read ports in the second subset is routed to one of the first plurality of input ports.

13. The method of claim 12, further comprising:
reading a first subset of operands for a multiple operand instruction from the first subset of the plurality of read ports in the first execution unit; and
reading a second subset of operands for the multiple operand instruction from the second subset of the plurality of read ports in the first execution unit while the at least one of the plurality of read ports associated with the second execution unit is routed to an input port of the first execution unit.

14. The method of claim 13, wherein inserting the bubble comprises scheduling the bubble in instructions scheduled by the second scheduler circuit for the second execution unit while the first execution unit reads the second subset of operands.

* * * * *